United States Patent
Lee et al.

(10) Patent No.: US 8,335,214 B2
(45) Date of Patent: Dec. 18, 2012

(54) INTERFACE SYSTEM AND METHOD OF CONTROLLING THEREOF

(75) Inventors: Jae-bok Lee, Seongnam-si (KR); Ki-cheol Lee, Suwon-si (KR); Yong Ho Song, Seongnam-si (KR); Jaehyeong Jeong, Guri-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 219 days.

(21) Appl. No.: 12/382,177

(22) Filed: Mar. 10, 2009

(65) Prior Publication Data
US 2009/0238186 A1 Sep. 24, 2009

(30) Foreign Application Priority Data
Mar. 18, 2008 (KR) .................. 10-2008-0024893

(51) Int. Cl.
*H04L 12/26* (2006.01)
*H04L 12/56* (2006.01)

(52) U.S. Cl. ............... 370/389; 370/392; 370/395.5; 370/471; 370/474; 700/2

(58) Field of Classification Search .......... 370/389, 370/392, 395.5, 419, 471, 474; 700/2; 711/212
See application file for complete search history.

(56) References Cited

U.S. PATENT DOCUMENTS

| | | | | |
|---|---|---|---|---|
| 5,870,567 A * | 2/1999 | Hausauer et al. | ............. | 710/310 |
| 5,903,324 A * | 5/1999 | Lyons et al. | ............. | 375/240.26 |
| 5,920,572 A * | 7/1999 | Washington et al. | ......... | 370/535 |
| 5,956,344 A * | 9/1999 | Cole | ............. | 370/465 |
| 6,229,808 B1 * | 5/2001 | Teich et al. | ............. | 370/398 |
| 6,301,248 B1 * | 10/2001 | Jung et al. | ............. | 370/392 |
| 6,314,100 B1 * | 11/2001 | Roach et al. | ............. | 370/394 |
| 6,708,233 B1 * | 3/2004 | Fuller et al. | ............. | 710/22 |
| 6,847,645 B1 * | 1/2005 | Potter et al. | ............. | 370/392 |
| 6,931,007 B2 * | 8/2005 | Jones | ............. | 370/392 |
| 6,947,430 B2 * | 9/2005 | Bilic et al. | ............. | 370/395.71 |
| 6,961,338 B2 * | 11/2005 | Nabesako et al. | ............. | 370/392 |
| 7,120,435 B2 * | 10/2006 | Usher et al. | ............. | 455/431 |
| 7,130,958 B2 * | 10/2006 | Chou et al. | ............. | 711/103 |
| 7,366,165 B2 * | 4/2008 | Kawarai et al. | ............. | 370/366 |
| 7,415,652 B1 * | 8/2008 | Szeremi | ............. | 714/758 |

(Continued)

FOREIGN PATENT DOCUMENTS
KR 10-2004-0040458 5/2004

*Primary Examiner* — Hoon J Chung
*Assistant Examiner* — Benjamin H Elliott, IV
(74) *Attorney, Agent, or Firm* — Harness, Dickey & Pierce, P.L.C.

(57) ABSTRACT

Provided are an interface system and a method of controlling the interface system. The interface system may include a memory, a first processor, a second processor, and an interface unit. The memory may be configured to store received data in packets. The first processor may be configured to analyze a header of each of the packets to obtain analysis information. The second processor may be configured to receive and process a payload of the packet that includes the analyzed header and the payload. The interface unit may be configured to transmit only the payload to the second processor based on the analysis information. Since the interface system and the method may directly transmit only the payload of the packet to the processor without copying the payload to a separate memory, memory usage efficiency and system performance may be improved and power consumption may be reduced.

18 Claims, 6 Drawing Sheets

U.S. PATENT DOCUMENTS

| | | | | |
|---|---|---|---|---|
| 7,542,465 B2* | 6/2009 | Houghton et al. | | 370/389 |
| 7,543,096 B2* | 6/2009 | Davies | | 710/268 |
| 7,565,693 B2* | 7/2009 | Shin et al. | | 726/23 |
| 7,590,721 B2* | 9/2009 | Alfano | | 709/223 |
| 7,630,402 B2* | 12/2009 | Un et al. | | 370/469 |
| 7,680,104 B2* | 3/2010 | Shore | | 370/389 |
| 7,773,630 B2* | 8/2010 | Huang et al. | | 370/474 |
| 2002/0057669 A1* | 5/2002 | Joung | | 370/351 |
| 2003/0200324 A1* | 10/2003 | Jeong | | 709/230 |
| 2004/0013117 A1* | 1/2004 | Hendel et al. | | 370/394 |
| 2006/0268913 A1* | 11/2006 | Singh et al. | | 370/412 |
| 2006/0271823 A1* | 11/2006 | Smith | | 714/37 |
| 2007/0140297 A1* | 6/2007 | Chung et al. | | 370/473 |
| 2007/0223472 A1* | 9/2007 | Tachibana et al. | | 370/389 |
| 2007/0237151 A1* | 10/2007 | Alfano | | 370/392 |
| 2008/0117906 A1* | 5/2008 | Xie | | 370/392 |
| 2009/0019538 A1* | 1/2009 | Pandya | | 726/13 |
| 2009/0103504 A1* | 4/2009 | Inumaru | | 370/338 |
| 2009/0238186 A1* | 9/2009 | Lee et al. | | 370/392 |

* cited by examiner

FIG. 4

| H_16 | P_16 |
| H_24 | P_24 |
| H_15 | P_15 |
| H_23 | P_23 |
| H_22 | P_22 |
| H_14 | P_14 |
| H_13 | P_13 |
| H_21 | P_21 |
| H_12 | P_12 |
| H_11 | P_11 |

FIG. 5

| H'_16 | GAR | P_16 |
| H'_24 | GAR | P_24 |
| H'_15 | GAR | P_15 |
| H'_23 | GAR | P_23 |
| H'_22 | GAR | P_22 |
| H'_14 | | P_14 |
| H'_13 | GAR | P_13 |
| H'_21 | GAR | P_21 |
| H'_12 | | P_12 |
| H'_11 | GAR | P_11 |

| P_11 | P_12 |
| P_12 | P_13 | P_14 |
| P_14 | P_15 |
| P_15 | P_16 |

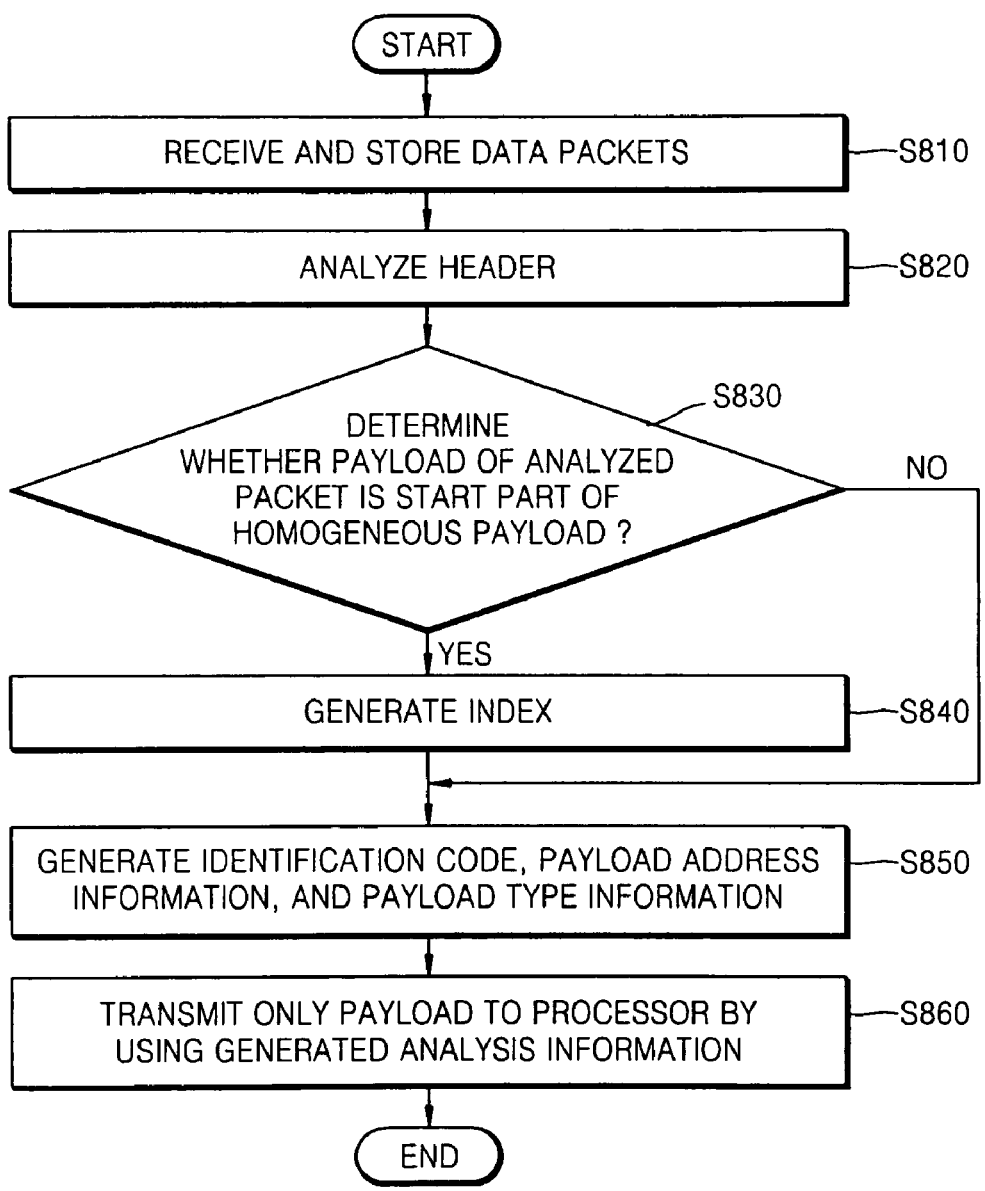

INTERFACE SYSTEM AND METHOD OF CONTROLLING THEREOF

PRIORITY STATEMENT

This application claims the benefit of Korean Patent Application No. 10-2008-0024893, filed on Mar. 18, 2008, in the Korean Intellectual Property Office, the disclosure of which is incorporated herein in its entirety by reference.

BACKGROUND

1. Field

Example embodiments relate to an interface system, for example, to an interface system based on streaming and a method of controlling the interface system.

2. Description of the Related Art

Streaming-based multimedia services are widely used through the Internet and related various products are also used. Recently, personal information storage devices have turned into multimedia devices such as a personal portable multimedia player and a portable digital broadcasting receiver. Accordingly, there are demands for minimizing the power consumption, price, and memory capacity needed of portable multimedia players.

SUMMARY

Example embodiments may provide an interface system that may improve memory usage efficiency and system performance and may reduce power consumption by directly transmitting only payloads to a processor without copying the payloads to a separate memory.

Example embodiments may also provide a method of controlling the interface system.

According to example embodiments, there may be provided an interface system including a memory configured to store received data in packets, a first processor configured to analyze a header of each of the packets to obtain analysis information, a second processor configured to receive and process a payload of the packet that includes the analyzed header and the payload, and an interface unit configured to transmit only the payload to the second processor based on the analysis information.

The analysis information may include at least one of an identification code indicating whether the header is analyzed, payload address information indicating an address of the payload in the packet, and payload type information indicating whether the payload belongs to a homogeneous payload.

The analysis information may further include an index indicating a type of the packet if the payload of the analyzed packet is a start part of the homogeneous payload.

The payload address information may the payload address information may include one of a start address of the payload when the packet has a fixed length and the start address of the payload and total length information of the packet when the packet has a variable length.

The first processor may overwrite a portion of the header of the packet stored in the memory with the analysis information. The analysis information may be less than or equal to a size of an initial header of the packet.

The interface unit may transmit the payload to one of a plurality of second processors based on the analysis information..

According to example embodiments, there may be provided a method of controlling data transmission in an interface system, the method including receiving and storing data in packets, analyzing a header of each of the packets to obtain analysis information, and transmitting only a payload of the packet to the processor based on the analysis information.

Example embodiments may further include determining whether the payload of the analyzed packet is a start part of a homogeneous payload and/or generating an index indicating a type of the packet when it is determined that the payload of the analyzed is the start part of the homogeneous payload.

Example embodiments may further include generating at least one of an identification code indicating whether the header is analyzed, payload address information indicating an address of the payload in the packet, and payload type information indicating whether the payload belongs to the homogeneous payload.

BRIEF DESCRIPTION OF THE DRAWINGS

The above and other features and advantages will become more apparent by describing in detail example embodiments with reference to the attached drawings in which:

FIG. 4 illustrates packets stored in a memory of the interface system of FIG. 1;

FIG. 5 illustrates a state in which a first processor of the interface system of FIG. 1 overwrites portions of headers with analysis information obtained by analyzing the headers of the packets of FIG. 4;

FIG. 7 is a flowchart illustrating a method of controlling data transmission between a receiver and the second processor of the interface system of FIG. 1, according to example embodiments.

DETAILED DESCRIPTION

Figure 1:
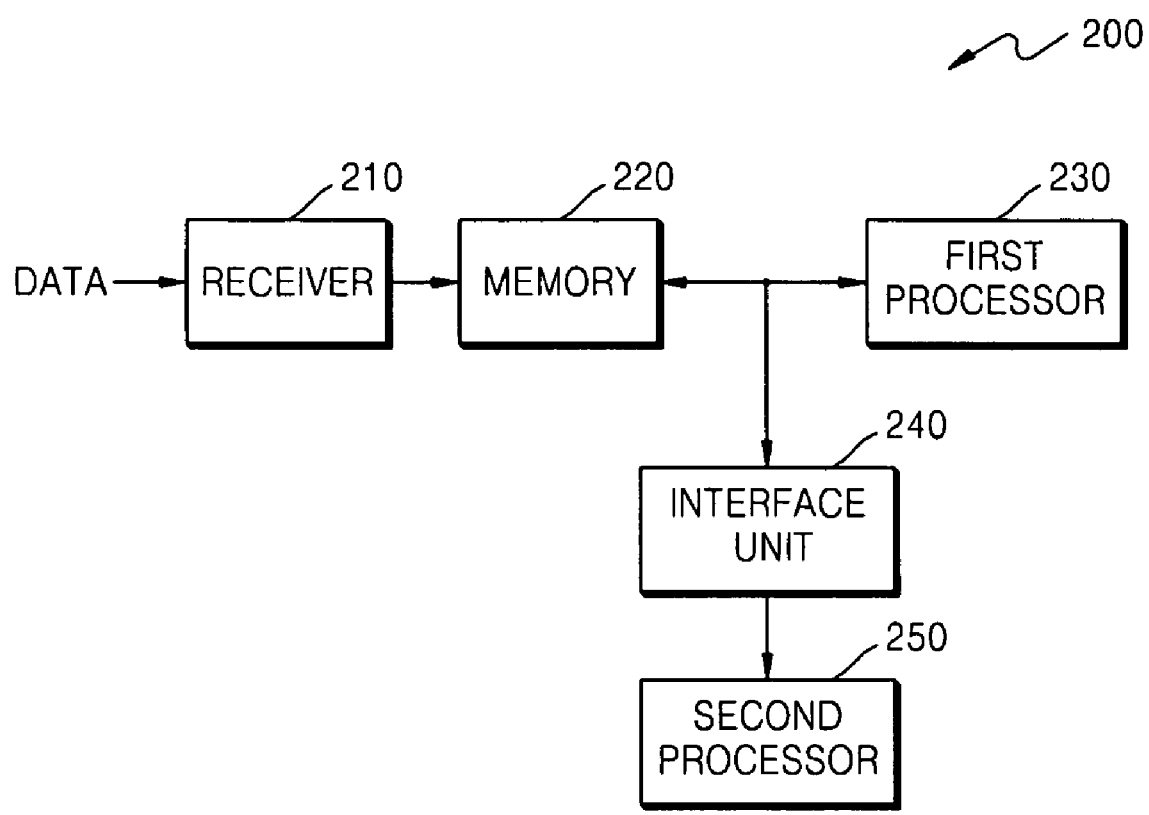
FIG. 1 is a block diagram of an interface system based on streaming according to example embodiments.

The above and other features and advantages will become more apparent by describing in detail example embodiments with reference to the attached drawings. In the drawings, like reference numerals denote like elements.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. In this specification, the term "and/or" picks out each individual item as well as all combinations of them.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Now, in order to more specifically describe example embodiments, example embodiments will be described in detail with reference to the attached drawings. However, example embodiments are not limited to the embodiments described herein, but may be embodied in various forms. In the figures, if a layer is formed on another layer or a substrate, it means that the layer is directly formed on another layer or a substrate, or that a third layer is interposed there between.

FIG. 1 is a block diagram of an interface system 200 based on streaming according to example embodiments.

Referring to FIG. 1, the interface system 200 includes a receiver 210, a memory 220, a first processor 230, an interface unit 240, and a second processor 250. The receiver 210 may receive data DATA in packets. The memory 220 may store the received packets therein. The first processor 230 may analyze a header of each of the packets to obtain analysis information. In this case, the first processor 230 may overwrite a portion of the header of the packet with the analysis information. Also, the first processor 230 may designate a portion, other than the portion of the header which is overwritten with the analysis information, as an unused portion. Hence, the analysis information may have a size less than or equal to that of an initial header of the packet before was overwritten with the analysis information. The second processor 250 may receive and process only a payload of the packet that includes the analyzed header and the payload. The interface unit 240 may transmit only the payload to the second processor 250 by using the analysis information. For example, when the second processor 250 transmits a command to receive the payload, the interface unit 240 may transmit only the payload of the packet stored in the memory 220. Accordingly, only the payload of the packet stored in the memory 220 may be directly transmitted through the interface unit 240 to the second processor 250. Additionally, the payload may be transmitted without being copied to a separate memory and then transmitted to the second processor 250.

Figure 2A:
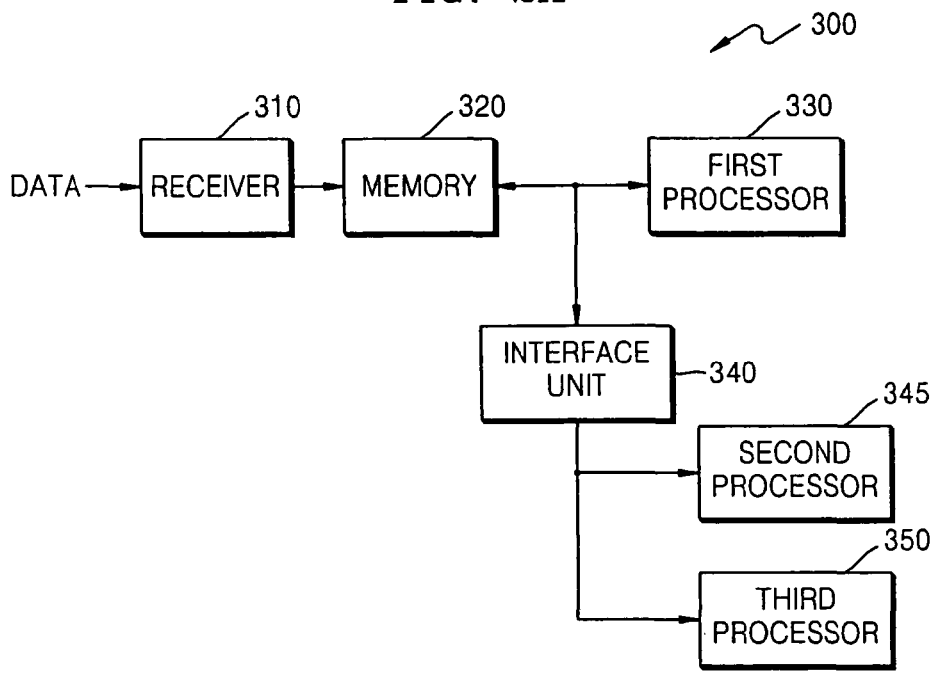
FIG. 2A is another block diagram of an interface system including a plurality of processors according to example embodiments.

FIG. 2A is another block diagram of an interface system 300 including a plurality of processors according to example embodiments.

Figure 2B:
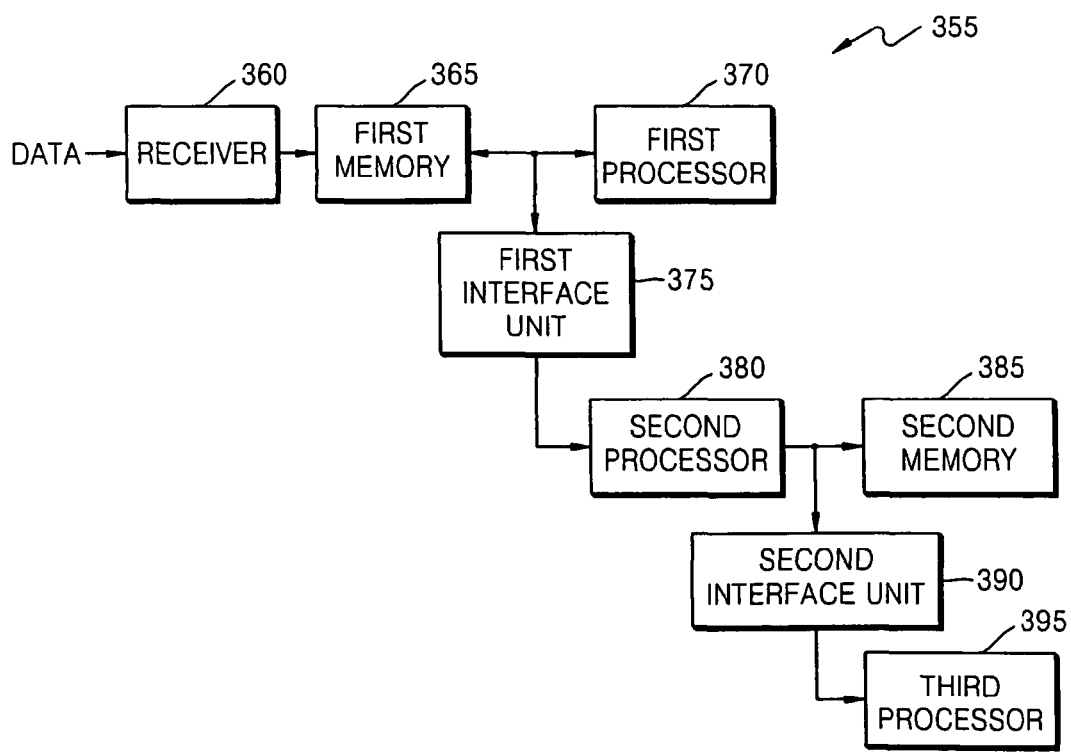
FIG. 2B is yet another block diagram of an interface system including a plurality of processors according to example embodiments.

FIG. 2B is yet another block diagram of an interface system 355 including a plurality of processors according to example embodiments.

While the interface system 200 of FIG. 1 includes one second processor 250, each of the interface systems 300 and 355 of FIGS. 2A and 2B include a plurality of processors each performing substantially the same function as that of the second processor 250 of the interface system 200.

Referring to FIGS. 1 and 2A, since a receiver 310, a memory 320, and a first processor 330 of the interface system 300 in FIG. 2A may be the same in operation as the receiver 210, the memory 220, and the first processor 230 of the interface system 200 in FIG. 1, respectively, a detailed explanation thereof will not be given. Each of a second processor 345 and a third processor 350 of the interface system 300 in FIG. 2A may be the same in operation as the second processor 250 of the interface system 200 of FIG. 1. For example, when data is transmitted according to different protocols, the second processor 345 and the third processor 350 may operate according to one of the corresponding protocols. For example, the second processor 345 may operate when data is transmitted according to a first protocol and the third processor 350 may operate when data is transmitted according to a second protocol. Accordingly, an interface unit 340 may transmit a corresponding payload to one of the second processor 345 and the third processor 350 by using the analysis information.

Referring to FIGS. 1 through 2B, since a receiver 360, a first memory 365, and a first memory 370 of the interface system 355 of FIG. 2B may be the same in operation as the receiver 210, the memory 220, and the first processor 230 of the interface system 200 of FIG. 1, respectively, a detailed explanation thereof will not be given. Each of a second processor 380 and a third processor 395 of the interface system 355 of FIG. 2B may be the same in operation as the second processor 250 of the interface system 200 of FIG. 1. For example, it may be assumed that the second processor 380 operates when data is transmitted according to the first protocol, and the third processor 395 operates when data is transmitted according to the second protocol. A first interface unit 375 may transmit a payload corresponding to the first protocol to the second processor 380 by using the analysis information, and a second interface unit 390 may transmit a payload corresponding to the second protocol to the third processor 395 by using the analysis information. For example, the interface system 355 of FIG. 2B may include the first and second interface units 375 and 390 respectively corresponding to the first and second protocols, unlike the interface system 300 of FIG. 2A.

Although two processors performing the same function as that of the second processor 250 of the interface system 200 are shown in FIGS. 2A and 2B, it would be obvious to one of ordinary skill in the art that example embodiments are not limited thereto and modifications in the number of processors are intended to be included within the scope of example embodiments.

A process of generating the analysis information by using a header and a process of transmitting only a payload by using the analysis information will now be explained in more detail.

Figure 3A:
FIG. 3A is a block diagram of a received packet.
Figure 3B:
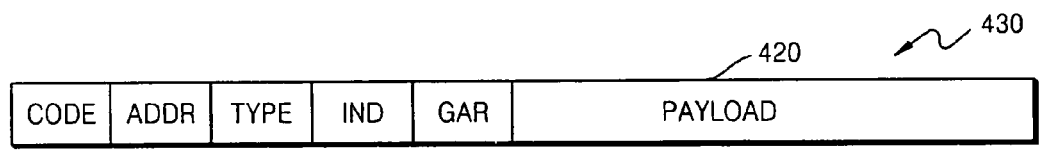
FIG. 3B is a block diagram of an analyzed packet obtained by analyzing a header of the packet of FIG. 3A, according to example embodiments.
Figure 3C:
FIG. 3C is another block diagram of an analyzed packet obtained by analyzing a header of the packet of FIG. 3A, according to example embodiments.

FIG. 3A is a block diagram of a received packet 400. FIG. 3B is a block diagram of an analyzed packet obtained by analyzing a header of the packet 400 of FIG. 3A, according to example embodiments. FIG. 3C is another block diagram of an analyzed packet obtained by analyzing a header of the packet 400 of FIG. 3A, according to example embodiments.

Referring to FIGS. 1 and 3A, the packet 400 received by the receiver 210 may include a header HEADER 410 and a payload PAYLOAD 420. The header HEADER 410 may include a plurality of subheaders according to received data. Even when the header HEADER 410 includes the plurality of subheaders, since the subheaders are analyzed to obtain analysis information in a similar manner, a detailed explanation thereof will not be given. However, it would be obvious to one of ordinary skill in the art that, even when the header HEADER 410 includes the plurality of subheaders instead of one subheader, the same effect may be obtained by analyzing the subheaders in a similar manner to that of a single subheader.

Referring to FIGS. 1 through 3B, when the payload PAYLOAD 420 is a start part of a homogeneous payload, a portion of the header HEADER 410 may be overwritten with analysis information obtained by analyzing the header HEADER 410 as shown in FIG. 3B. For example, when the header HEADER 410 of the packet 400 of FIG. 3A is analyzed to form the analyzed packet 430, analysis information including an identification code CODE, payload address information ADDR, payload type information TYPE, and an index IND as shown in FIG. 3B may be generated. The identification code CODE may indicate whether the header HEADER 410 is analyzed. Therefore, whether the header HEADER 410 is analyzed may be determined by using the identification code CODE.

The payload address information ADDR may indicate an address of the payload PAYLOAD 420 of the analyzed packet 430. In general, an address where the payload PAYLOAD 420 starts in the analyzed packet 430 may not be known. However, an address where the payload PAYLOAD 420 starts may be known by analyzing the header HEADER 410. The payload address information ADDR may be information on an address of the payload 420. When the analyzed packet 430 has a fixed length, the entire payload PAYLOAD 420 may be known by knowing a start address of the payload PAYLOAD 420. Accordingly, the payload address information ADDR may include the start address of the payload PAYLOAD 420. However, when the analyzed packet 430 has a variable length, even though the start address of the payload PAYLOAD 420 may be known, the entire payload PAYLOAD 420 may not be known. Accordingly, the payload address information ADDR may include the start address of the payload PAYLOAD 420 and a total length of the analyzed packet 430, or include the start address of the payload PAYLOAD 420 and an end address of the payload PAYLOAD 420.

The payload type information TYPE may indicate whether the payload PAYLOAD 420 belongs to a homogeneous payload. In general, since data is packaged by using a plurality of packets, which are then transmitted, a plurality of packets obtained by dividing and packaging a homogeneous payload may be transmitted. Accordingly, it may be necessary to determine whether the payload PAYLOAD 420 belongs to a homogeneous payload or a heterogeneous payload. The payload type information TYPE may perform the function of indicating whether the payload PAYLOAD 420 belongs to the homogenous payload or the heterogeneous payload. The payload type information TYPE may also include information on whether the payload PAYLOAD 420 is a start part, a middle part, or an end part of the homogeneous payload.

The index IND may indicate a type of the analyzed packet 430. For example, whether the analyzed packet 430 is video data or audio data may be determined by using the index IND. The index IND may be included in the analysis information only when the payload PAYLOAD 420 is the start part of the homogeneous payload.

As described above, the first processor 230 may overwrite a portion of the header HEADER 410 of the packet 400 with the analysis information including the identification code CODE, the payload address information ADDR, the payload type information TYPE, and the index IND. In this case, the analysis information including the identification code CODE, the payload address information ADDR, the payload type information TYPE, and the index IND may have a size less than or equal to that of the portion of the header HEADER 410. If the size of the analysis information including the identification code CODE, the payload address information ADDR, the payload type information TYPE, and the index IND is less than that of the portion 410 of the header, a remaining portion, other the portion of the header HEADER 410 which is overwritten with the analysis information, is designated as an unnecessary portion GAR and thus may not be used.

Referring to FIGS. 1 through 3C, when the payload PAYLOAD 420 is not a start part of a homogeneous payload, a portion of the header HEADER 410 is overwritten with analysis information including an identification code CODE, payload address information ADDR, and payload type information TYPE as shown in FIG. 3C. For example, when the header HEADER 410 of the packet 400 of FIG. 3A is analyzed to form the analyzed packet 450, analysis information including an identification code CODE, payload address information ADDR, and payload type information TYPE as shown in FIG. 3C may be generated. The analysis information of FIG. 3C may not include an index IND, unlike the analysis information of FIG. 3B, because the index IND may already be included in the analysis information when the payload PAYLOAD 420 is the start part of the homogeneous payload as described above. Since the identification code CODE, the payload address information ADDR, and the payload type information TYPE of FIG. 3C may be the same as the identification code CODE, the payload address information ADDR, and the payload type information TYPE of FIG. 3B, a detailed explanation thereof will not be given.

The payloads PAYLOAD 4250 included in the packets 400, 430, and 450 of FIGS. 3A through 3C may be the same. For example, although the analysis information obtained by analyzing the header HEADER 410 may be overwritten on a portion of the header HEADER 410, the payload PAYLOAD 420 may be maintained regardless of whether the header HEADER 410 is analyzed.

FIG. 4 illustrates packets stored in the memory 220 of the interface system 200 of FIG. 1.

FIG. 5 illustrates a state in which the first processor 230 of the interface system 200 of FIG. 1 overwrites a portion of the header with analysis information obtained by analyzing headers of the packets of FIG. 4.

Figures 6A, 6B:
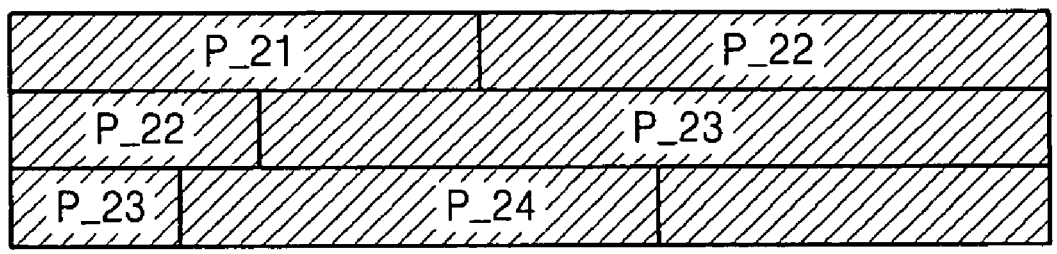
FIGS. 6A and 6B illustrate payloads, of the packets in the state of FIG. 5, transmitted to a second processor of the interface system of FIG. 1.

FIGS. 6A and 6B illustrate payloads, of the packets in the state of FIG. 5, transmitted to the second processor 250 of the interface system 200 of FIG. 1.

FIG. 7 is a flowchart illustrating a method of controlling data transmission between the receiver 210 and the second processor 250 of the interface system 200 of FIG. 1, according to example embodiments.

Referring to FIGS. 2A, and 3 through 7, in operation S810, data DATA is received in packets by the receiver 310 and is stored in the memory 320. Although the interface system 300 of FIG. 2A is explained as an example below, it would be obvious to one of ordinary skill in the art that the same effect may be obtained by performing the method in view of the interface system 200 or 355 of FIG. 1 or FIG. 2B. For example, it may be assumed that the data DATA is received by the receiver 310 and is stored in the memory 320 in the order in which the data DATA is received. For example, a lowermost packet (H_11, P_11) may be data that is first received by the receiver 310 and first stored in the memory 320. It may also be assumed that hatched packets (H_21, P_21), (H_22, P_22), (H_23, P_23), and (H_24, P_24) are packets obtained by dividing and packaging video data, and non-hatched packets (H_11, P_11), (H_12, P_12), (H_13, P_13), (H_14, P_14), and (H_15, P_15) are packets obtained by dividing and packaging audio data. It may be obvious to one of ordinary skill in the art that example embodiments are not limited thereto. The packets may include headers H_11, H_12, H_21, H_13, H_14, H_22, H_23, H_15, H_24, and H_16 and corresponding payloads P_11, P_12, P_21, P_13, P_14, P_22, P_23, P_15, P_24, and P_16. It may also be assumed that the second processor 345 processes the audio data and the third processor 350 processes the video data.

In operation S820, the first processor 330 may analyze a header of each of the packets. In operation S830, the first processor 330 may determine whether a payload of the analyzed packet is a start part of a homogeneous payload. If it is determined in operation S830 that the payload of the analyzed packet is the start part of the homogeneous payload, the method may proceed to operation S840 and then operation S850. In operation S840, analysis information including an index IND may be generated. In operation S850, analysis information including an identification code CODE, payload address information ADDR, and payload type information TYPE may be generated. If it is determined in operation S830 that the payload of the analyzed packet is not the start part of the homogeneous payload, the method may proceed to operation S850. In operation S850, analysis information including an identification code CODE, payload address information ADDR, and payload type information TYPE, but not an index IND, may be generated.

FIG. 5 illustrates a state in which portions of the headers of the packets of FIG. 4 are overwritten with analysis information obtained by analyzing the headers. For example, the first processor 330 may analyze the header H_11 to obtain analysis information H'_11, overwrite a portion of the header H_11 with the analysis information H'_11, and process a remaining portion as an unnecessary portion GAR. Also, the first processor 330 may analyze the header H_12 to obtain analysis information H'_12, and overwrite the header H_12 with the analysis information H'_12. Thus, H'_12, unlike H'_11, may not include a remaining unnecessary portion GAR. In the same manner, the first processor 330 may analyze the headers of the packets to obtain analysis information H'_21, H'_13, H'_14, H'_22, H'_23, H'_15, H'_24, and H'_16, and overwrite portions of the headers with the analysis information H'_21, H'_13, H'_14, H'_22, H'_23, H'_15, H'_24, and H'_16, respectively. It may be assumed that a payload P_11 and a payload P_16 correspond to a start part and an end part of the audio data, respectively, and a payload P_21 and a payload P_24 correspond to a start part and an end part of the video data, respectively. Hence, the packet including the payload P_11 and the packet including the payload P_21 among the analyzed packets may have the same structure as that of the analyzed packet 430 of FIG. 3B, and the other packets may have the same structure as that of the analyzed packet 450 of FIG. 3C.

The first processor 330 may continuously perform the analysis until a payload corresponds to an end part of a homogeneous payload. However, if the homogeneous payload needs to be transmitted partly, not entirely, to the second processor 345 or the third processor 350, only some analyzed payloads may be transmitted to the second processor 345 or the third processor 350.

In operation S860, the interface unit 340 may transmit only the payload to the second processor 345 or the third processor 350 by using the analysis information. The interface unit 340 may determine whether a corresponding header is analyzed by using the identification code CODE, determine whether the packet belongs to a homogeneous packet by using the index IND, and determine whether the payload is a start part, a middle part, or an end part of the homogeneous payload by using the payload type information TYPE. Also, the interface unit 340 may determine a position of the payload by using the payload address information ADDR.

A case in which the payloads related to the audio data are transmitted to the second processor 345 will be first explained with reference to FIG. 6A. The interface unit 340 may first transmit the payload P_11, which is the start part of the homogeneous payload, to the second processor 345 by using the identification code CODE, the index IND, the payload type information TYPE, and the payload address information ADDR. Next, the interface unit 340 may sequentially transmit the payloads P_12, P_13, P_14, and P_15, which are middle parts of the homogeneous payload, to the second processor 345 by using the analysis information. Finally, the interface unit 340 may transmit the payload P_16, which is an end part of the homogeneous payload, to the second processor 345 by using the analysis information.

A case in which the payloads related to the video data are transmitted to the third processor 350 will now be explained with reference to FIG. 6B. The interface unit 340 may first transmit the payload P_21, which is the start part of the homogeneous payload, to the third processor 350 by using the identification code CODE, the index IND, the payload type information TYPE, and the payload address information ADDR. Next, the interface unit 340 may sequentially transmit the payloads P_22 and P_23, which are middle parts of the homogeneous payload, to the third processor 350 by using the analysis information. Finally, the interface unit 340 may transmit the payload P_24, which is the end part of the homogeneous payload, to the third processor 350 by using the analysis information.

The payloads related to the audio data and the payloads related to the video data may be transmitted to the corresponding second processor 345 and the third processor 350 simultaneously or sequentially. Also, for example, if a plurality of pieces of video data or audio data are used, picture insertions, such as picture in picture (PiPO) or picture on picture (PoP), may be performed by the same method by transmitting the payloads to processors corresponding to the audio data and video data.

Although all the packets including the homogeneous payload are analyzed and then are transmitted to the second processor 345 or the third processor 350 in the above description, packets including a certain number of payloads may be analyzed and then only the payloads of the analyzed packets may be first transmitted to the second processor 345 or the third processor 340.

Since the interface system based on streaming and the method of controlling the interface system according to example embodiments may directly transmit only payloads of received packets to a processor without copying the payloads in a separate memory, memory usage efficiency and system performance may be improved and power consumption may be reduced.

While example embodiments have been particularly shown and described using specific terms, the embodiments and terms have been used to explain example embodiments and should not be construed as limiting the scope of example embodiments defined by the claims. Accordingly, it will be understood by those of ordinary skill in the art that various changes in form and details may be made therein without departing from the spirit and scope of example embodiments as defined by the following claims.

What is claimed is:

1. An interface system, the interface system comprising:
    a memory configured to store received data in packets, each of the packets including a header and a payload;
    a first processor configured to analyze the header of each of the packets to obtain analysis information, and to overwrite a portion of the header stored in the memory with the analysis information to generate an analyzed header such that each of the packets stored in the memory includes the analyzed header and the payload;
    a second processor configured to receive and process only the payload of the packet, the packet including the analyzed header and the payload; and
    an interface unit configured to transmit only the payload of the packet stored in the memory to the second processor based on the analysis information, wherein the analysis information includes an identification code indicating whether the header is analyzed, payload address information indicating an address of the payload in the packet, and payload type information indicating whether the payload belongs to a homogeneous payload.

2. The interface system of claim 1, wherein the analysis information further includes,
    an index indicating a type of the packet if the payload of the analyzed packet is a start part of the homogeneous payload.

3. The interface system of claim 2, wherein the interface unit determines whether the packet belongs to the homogeneous packet based on the index.

4. The interface system of claim 1, wherein the interface unit transmits the payload to the second processor based on the payload address information.

5. The interface system of claim 1, wherein the interface unit determines whether the payload of the analyzed packet is one of a start part, a middle part, and an end part of the homogeneous payload based on the payload type information.

6. The interface system of claim 1, wherein the interface unit determines whether the header is analyzed based on the identification code.

7. The interface system of claim 1, wherein the payload address information includes one of a start address of the payload when the packet has a fixed length and the start address of the payload and total length information of the packet when the packet has a variable length.

8. The interface system of claim 1, wherein the first processor continuously analyzes the header until the payload of the analyzed packet corresponds to an end part of the homogeneous payload.

9. The interface system of claim 1, wherein the first processor overwrites a portion of the header of the packet stored in the memory with the analysis information.

10. The interface system of claim 9, wherein the analysis information is less than or equal to a size of an initial header of the packet.

11. The interface system of claim 9, wherein the first processor designates a portion, other than the portion of the header which is overwritten with the analysis information, as an unused portion.

12. The interface system of claim 1, wherein the interface unit transmits the payload to one of a plurality of second processors based on the analysis information.

13. A method of controlling data transmission in an interface system, the method comprising:
    receiving and storing data in packets in a memory, each of the packets including a header and a payload;
    analyzing the header of each of the packets to obtain analysis information using a first processor;
    overwriting a portion of the header stored in the memory with the analysis information to generate an analyzed header using the first processor such that each of the packets stored in the memory includes the analyzed header and the payload;
    transmitting only the payload of the packet stored in the memory to a second processor of the interface system based on the analysis information;
    determining whether the payload of the analyzed packet is a start part of a homogeneous payload; and
    generating an index indicating a type of the packet when it is determined that the payload of the analyzed packet is the start part of the homogeneous payload.

14. The method of claim 13, further comprising:
    generating at least one of an identification code indicating whether the header is analyzed, payload address information indicating an address of the payload in the packet, and payload type information indicating whether the payload belongs to the homogeneous payload.

15. The method of claim 13, wherein the analysis information includes an identification code indicating whether the header is analyzed, payload address information indicating an address of the payload in the packet, and payload type information indicating whether the payload belongs to the homogeneous payload.

16. The method of claim 13, wherein the analyzing of the header includes continuously analyzing the header of the packet until the payload of the analyzed packet corresponds to an end part of the homogeneous payload.

17. The method of claim 13, further comprising:
    overwriting a portion of the header with the analysis information.

18. The method of claim 13, wherein the transmitting of the payload includes transmitting the payload to one of a corresponding plurality of processors based on the analysis information.

* * * * *